Nov. 11, 1952  R. R. MOORE  2,617,297
SPEED INDICATOR FOR TROLLING BOATS
Filed March 6, 1950
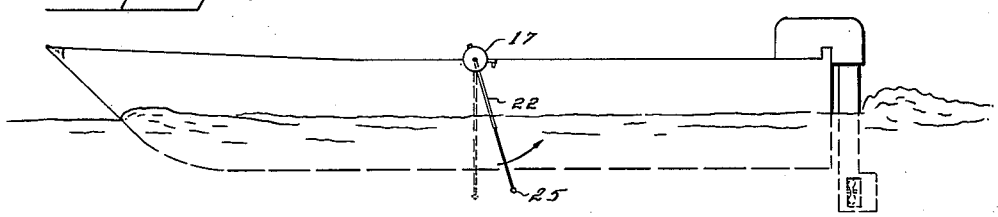
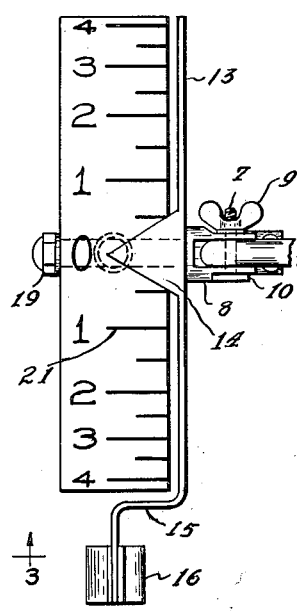
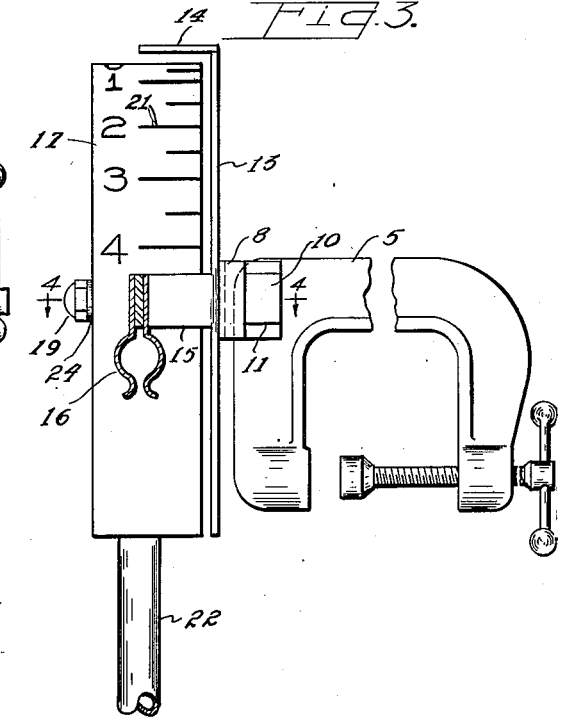
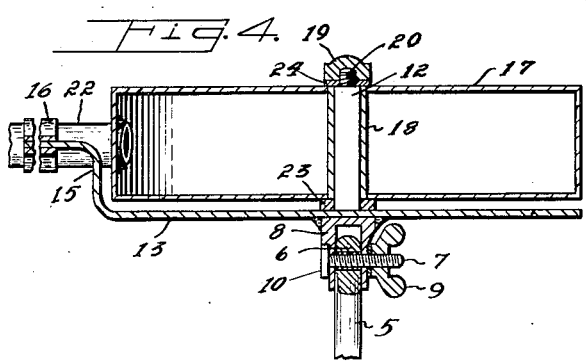
INVENTOR.
Robert R. Moore
BY Truck Wells.
ATTY.

Patented Nov. 11, 1952

2,617,297

UNITED STATES PATENT OFFICE 2,617,297

SPEED INDICATOR FOR TROLLING BOATS

Robert R. Moore, Spokane, Wash.

Application March 6, 1950, Serial No. 147,831

2 Claims. (Cl. 73—186)

The present invention relates to improvements in a speed indicator for trolling boats.

When trolling for fish it is necessary to maintain a somewhat steady speed so that the lure will not drag too near the surface of the water because of too much speed or too far to the bottom because of too slow a speed. It is well known that the fish will feed at certain levels and if the lure is above or below that level in the water it is relatively ineffective. The action of certain lures vary greatly as the speed changes. To obtain the correct action with one lure may require a slow speed, while another lure may require a relatively high speed for correct action.

It is very difficult especially in windy weather, to determine by guess, whether you are traveling at the proper speed through the water. It is the purpose of the present invention to provide a simple, relatively inexpensive indicator that can be attached to any ordinary boat to indicate the speed of the travel of the boat through the water, the indicator being of such nature that it will fit in a standard tackle box and that will not hang up on logs, weeds or other obstacles at the surface of the water.

The objects and advantages of my invention will appear more fully from the following description and the accompanying drawings wherein a preferred form of the invention is shown. It should be understood however, that the drawings and description are illustrative only and that various minor modifications may be made without departing from the spirit of the invention as defined in the claims.

In the drawings:

Figure 1 is a somewhat diagrammatic view of a boat in the water illustrating my improved speed indicator in position thereon;

Figure 2 is a plan view of the indicator;

Figure 3 is a sectional view taken on the line 3—3 of Figure 2; and

Figure 4 is a sectional view taken on the line 4—4 of Figure 3.

Referring now to the drawings, my improved speed indicator comprises a clamp 5 which may be of any suitable form that can be attached to the side of the boat. This clamp is provided with an aperture at 6 (see Figure 4) to receive a bolt 7 which clamps a bracket 8 to the clamp 5. A wing nut 9 is used to secure the bracket 8. The bolt 7 has a rectangular head 10 which fits in a recess 11 provided on the bracket 8.

The bracket 8 has a pivot pin 12 integral therewith. The bracket 8 also carries a sheet metal plate 13 which has a pointer 14 at the top. The plate 13 also has an off-set portion 15 which carries a spring clamp 16.

The pivot pin 12 serves to mount a rotating head 17. The head 17 has a sleeve 18 riding on the pivot pin and the head is held against removal by a cap screw 19 that is threaded on a reduced extension 20 of the pivot pin 12. Preferably the head 17 is hollow and made of light weight material. The head 17 also has graduations indicated at 21 in Figures 2 and 3 to cooperate with the pointer 14 and provide the speed indication.

Contact with the water is accomplished by a telescoping rod 22 which has its larger end fixed in the head 17. It is obvious of course, that the rod 22 may be made of any desired number of sections; the drawings indicate two sections which are sufficient for most purposes. In order that the head 17 may be free to rotate without binding on the plate 13, I provide a bushing 23 between the plate 13 and the head 17. I also provide a thin bushing 24 between the cap screw 19 and the head 17. It should be understood of course, that the clearance between bushings 23 and 24 is ample for the head 17 to rotate without binding.

The free end of the telescoping rod 22 has a weight 25 fixed thereon. Normally the rod 22 will tend to hang vertically from the pivot pin 12 because of the weight 25, however, when the boat is moving in the water the water will tend to swing the rod 22 and the head 17 about the pivot pin 12. Angular displacement of the rod 22 from the vertical is a rough indication of the speed of travel of the boat. This device is not intended to be an accurate speed measurer, however, it does give an indication of the rate at which the boat travels through the water. By extending the length of the rod 22 the sensitivity of the indicator is increased. Also the extensible characteristics of the rod 22 permit the device to be used on a variety of boats, some of which ride higher in the water than others. The spring clamp 16 is utilized to hold the rod 22 out of the water and out of the way when landing a boat or at any time when the indicating device is not in use. When landing a large fish the rod can be moved up into the clamp 16 and kept clear of the line. The clamping bracket 8 is so constructed that it will permit the entire indicating device to swing up inside the boat, also it will permit the indicating device to swing in toward the center of the boat a limited amount to bring the rod 22 close to the boat.

The dial is very easily adjusted to zero on any boat after it is loaded since the screw clamp 5 can be turned slightly to one side or the other before it is finally tightened in place. The indicator can be mounted on either side of the boat and due to the pivot connection of the bracket 8 to the clamp 5 the indicator can be set vertically and clamped in place by the wing nut 9 regardless of how much the side of the boat slopes inwardly.

It is believed that the nature and advantages of my invention will be clear from the foregoing description. Having thus described my invention, I claim:

1. A trolling speed indicator for fishing boats, comprising a clamp adapted to be attached to the side of a boat, a bracket, means pivotally and adjustably mounting the bracket on said clamp to swing crosswise with respect to the side of a boat on which the clamp is attached between a position above the clamp and a position alongside the clamp, means to secure the bracket in each of said positions, a weighted rod, a supporting head for said rod, means pivotally mounting the head on the bracket to swing in a plane perpendicular to the plane of movement of the bracket on the clamp, indicators on said head and the bracket to indicate the angular inclination of said rod with respect to the bracket due to movement of the boat and rod through the water, and means operable to secure the rod in raised horizontal position along the side of a boat to which the clamp is attached.

2. A trolling speed indicator for fishing boats comprising an U-shaped clamp having means to clamp the side wall of a boat between the legs of said clamp, a pivot bolt extending transversely through a portion of the clamp, a bracket pivoted to said clamp by said bolt to swing crosswise with respect to the side of a boat on which the clamp is attached between a position above the clamp and a position alongside the clamp, means to secure the bracket in each of said positions, a weighted rod, a supporting head for said rod, means pivotally mounting the head on the bracket to swing in a plane perpendicular to the plane of movement of the bracket on the clamp, indicators on said head and the bracket to indicate the angular inclination of said rod with respect to the bracket due to movement of the boat and rod through the water, and means operable to secure the rod in raised horizontal position along the side of a boat to which the clamp is attached.

ROBERT R. MOORE.

REFERENCES CITED

The following references are of record in the file of this patent:

UNITED STATES PATENTS

| Number | Name | Date |
|---|---|---|
| 2,075,424 | Bull | Mar. 30, 1937 |
| 2,152,768 | Meyers | Apr. 4, 1939 |
| 2,322,883 | Reichel | June 29, 1943 |
| 2,389,603 | Dollinger | Nov. 27, 1945 |
| 2,525,639 | Bluhm | Oct. 10, 1950 |

FOREIGN PATENTS

| Number | Country | Date |
|---|---|---|
| 215,692 | Switzerland | July 15, 1941 |